US006882061B1

(12) United States Patent
Ashtiani et al.

(10) Patent No.: US 6,882,061 B1
(45) Date of Patent: Apr. 19, 2005

(54) BATTERY SELF-WARMING MECHANISM USING THE INVERTER AND THE BATTERY MAIN DISCONNECT CIRCUITRY

(75) Inventors: Cyrus N. Ashtiani, West Bloomfield, MI (US); Thomas A. Stuart, Toledo, OH (US)

(73) Assignees: DaimlerChrysler Corporation, Auburn Hills, MI (US); University of Toledo, Toledo, OH (US)

( * ) Notice: Subject to any disclaimer, the term of this patent is extended or adjusted under 35 U.S.C. 154(b) by 0 days.

(21) Appl. No.: 09/224,467

(22) Filed: Dec. 31, 1998

(51) Int. Cl.[7] .............................................. H02H 7/18
(52) U.S. Cl. ....................... 307/10.7; 307/50; 219/209
(58) Field of Search .................... 307/10.7, 50; 219/209

(56) References Cited

U.S. PATENT DOCUMENTS

| | | | | |
|---|---|---|---|---|
| 4,222,000 A | * | 9/1980 | Silvertown et al. | 322/33 |
| 4,309,622 A | * | 1/1982 | Cottrell | 307/150 |
| 4,491,779 A | * | 1/1985 | Campbell et al. | 320/123 |
| 5,291,388 A | * | 3/1994 | Heinrich | 363/98 |
| 5,362,942 A | * | 11/1994 | Vanderslice et al. | 219/209 |
| 5,488,283 A | * | 1/1996 | Dougherty et al. | 307/10.1 |
| 5,552,980 A | * | 9/1996 | Garces et al. | 363/98 |
| 5,710,699 A | * | 1/1998 | King et al. | 363/132 |
| 5,760,488 A | | 6/1998 | Sonntag | |
| 5,808,469 A | | 9/1998 | Kopera | |
| 5,824,432 A | | 10/1998 | Currle | |
| 5,831,514 A | | 11/1998 | Hilpert et al. | |
| 5,956,241 A | * | 9/1999 | LoCascio | 363/21.14 |
| 6,054,842 A | * | 4/2000 | Verzwyvelt et al. | 320/135 |
| 6,331,365 B1 | * | 12/2001 | King | 429/9 |
| 6,710,574 B1 | * | 3/2004 | Davis et al. | 318/800 |
| 2003/0053324 A1 | * | 3/2003 | Yamamoto et al. | 363/127 |

* cited by examiner

*Primary Examiner*—Brian Sircus
*Assistant Examiner*—Brett Squires
(74) *Attorney, Agent, or Firm*—Ralph E. Smith

(57) ABSTRACT

An apparatus connected to an energy storage device for powering an electric motor and optionally providing a warming function for the energy storage device is disclosed. The apparatus includes a circuit connected to the electric motor and the energy storage device for generating a current. The apparatus also includes a switching device operably associated with the circuit for selectively directing the current to one of the electric motor and the energy storage device.

20 Claims, 6 Drawing Sheets

BATTERY SELF-WARMING MECHANISM USING THE INVERTER AND THE BATTERY MAIN DISCONNECT CIRCUITRY

STATEMENT REGARDING FEDERALLY SPONSORED RESEARCH OR DEVELOPMENT

This invention was made with Government support under NREL subcontract number ZAN-6-16334-01, prime contract number DE-AC36-83CH10093 issued by the Department of Energy. The government has certain rights in this invention.

BACKGROUND OF THE INVENTION

1. Technical Field

The present invention generally relates to a device for heating batteries. More particularly, the present invention is directed to an electrical circuit and mechanism using an inverter circuit and the battery main disconnect circuitry to heat the battery or a group of batteries.

2. Discussion

It is well known that most electrochemical batteries including lead acid, NiCd, NiMH, or Li-Ion, Li-Polymer, etc. with potential use in electric, hybrid electric, or in conventional vehicles typically need some form of heating at cold, particularly extreme cold temperatures before they can deliver their full power capability. Traditional methods of warming up starter batteries in the cars have included leaving the headlights on for a few moments or even applying a short at the battery terminals momentarily to warm up the battery. These methods, including those using an external energy source, such as a heated jacket, to warm up the battery, tend to waste a substantial amount of energy outside the battery in order to obtain a proportionately small increase in the battery internal temperature.

Research and investigation has shown that the most efficient way of self-heating a battery is through exchanging energy back and forth between the battery and an external energy storage device such as an inductor or a capacitor, or a combination thereof. An exemplary circuit for performing this energy exchange for battery self heating is disclosed in U.S. application Ser. No. 09/070,331, filed Apr. 30, 1998, which is commonly owned and expressly incorporated herein by reference. An even simpler way of implementing this concept is by passing an alternating current through the battery, which is effectively a constant voltage source.

Laboratory experiments have shown that, depending on the battery chemistry, the internal impedance of the battery at −20° C. (below freezing) drops to as much as half when subjected to a 10 Amp 60 Hz current in less than 50 seconds for a 6–10 Ah battery. This means that the power delivery capability of the battery doubles in less than 50 seconds. Increasing the frequency as well as the magnitude of the current applied can substantially reduce this time, but the impact on the battery life may be adversely affected.

In hybrid electric vehicles (HEV), the most effective way of warming the battery in subfreezing temperatures is through charging. For example, the vehicle's engine (gas, diesel, etc.) will propel the electric motor in the "generator mode" and the motor inverter in the "rectifier" mode to effectively charge the vehicle's battery using the engine's power. Since the impedance of the battery rises considerably in the extreme cold, the charging or flow of current through the battery automatically warms up the battery internally much more effectively than in above-freezing temperatures.

This option is not available in pure electric vehicles (EV) due to the absence of the supplemental engine or power source. In view of this limitation with electric vehicles, it is desirable to provide a circuit which is capable of warming the battery used for powering the electric vehicle during cold environmental conditions. It is also desirable to provide a circuit which can be easily incorporated with the existing power circuitry for the electric vehicle. Finally, it is desirable to provide a circuit which provides a dual function within the electric vehicle for minimizing the number of components within the electric vehicle's power circuit.

SUMMARY OF THE INVENTION

In accordance with the teachings of the present invention, an apparatus connected to an energy storage device for powering an electric motor and optionally providing a warming function for the energy storage device is disclosed. The apparatus includes a circuit connected to the electric motor and the energy storage device for generating a current. The apparatus also includes a switching device operably associated with the circuit for selectively directing the current to one of the electric motor and the energy storage device.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENT

Figure 1:
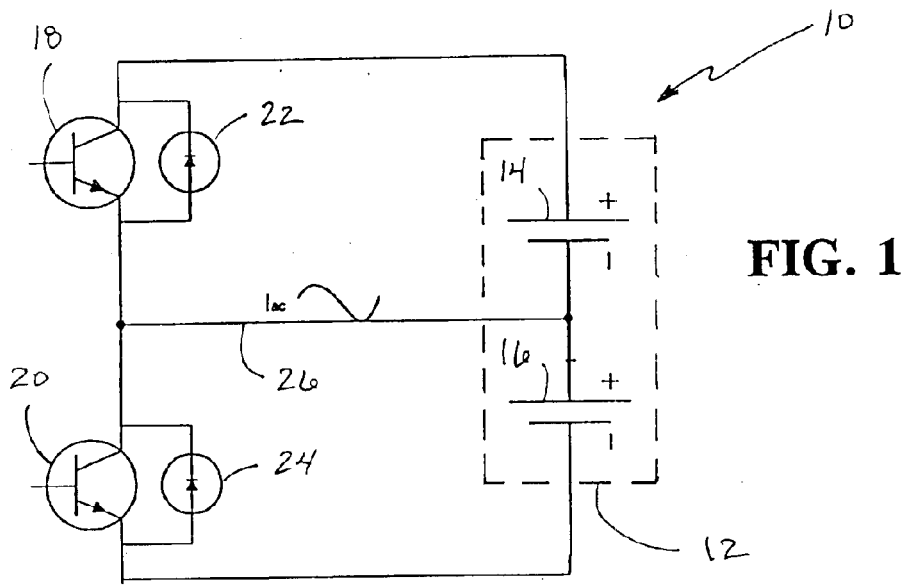
FIG. 1 is a schematic diagram of a dual function inverter circuit and battery warming circuit in accordance with a preferred embodiment of the present invention.

The following description of the preferred embodiment is merely exemplary in nature and is in no way intended to limit the invention, its applications or uses. Referring now to FIG. 1, the circuit 10 for warming a multi-cell battery pack 12 according to the teachings of the present invention is shown. As shown, the battery pack 12 includes a first battery cell 14 and a second battery cell 16, which are connected in series. A common node 26 is disposed between battery 14 and battery 16. A first transistor 18 is connected between the positive terminal of battery 14 and the common node 26. A second transistor 20 is connected between the common node 26 and the negative terminal of battery 16. A first anti-parallel diode 22 has its cathode connected to the positive terminal of battery 14 and its anode connected to common node 26. A second anti-parallel diode 24 has its cathode connected to common node 26 and its anode connected to the negative terminal of battery 16.

In the preferred embodiment, transistors 18 and 20 are insulated gate bipolar transistors (IGBTs). However, the principles of the invention may be extended to the use of other switching devices such as MOSFET's, BJT's, and MCT's. Circuit 10 may be used as a simple DC to AC inverter for generating an alternating current by appropriately switching transistors 18 and 20 between a conducting and nonconducting state with a suitable control circuit. When this alternating current passes through the battery cells, 14, 16, heat is generated for warming the battery pack 12. As will be appreciated, circuit 10 is suitable for use as a DC to AC inverter for use with the electric motor of an electric vehicle.

Figure 2:
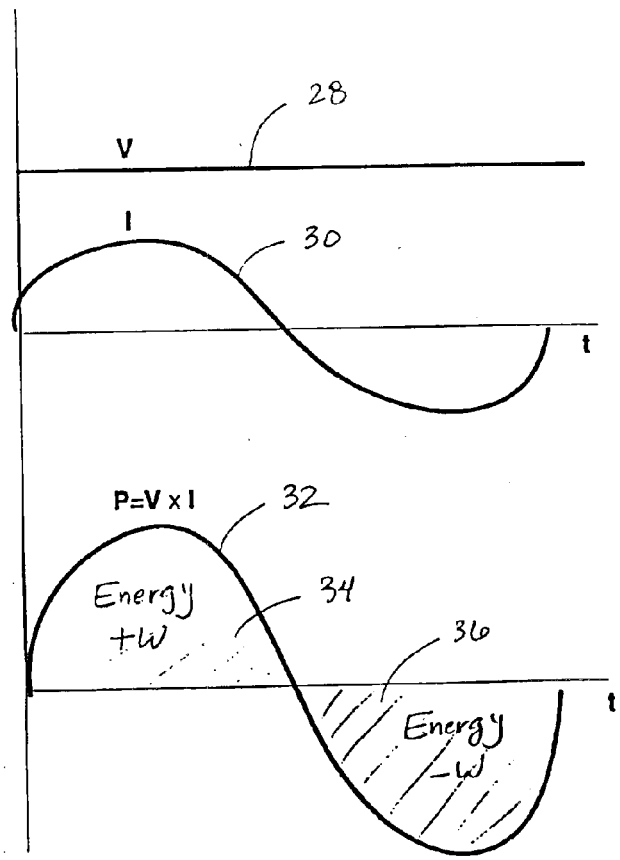
FIG. 2 is a graph of the waveforms which can be generated by the circuit of FIG. 1.

The graph of FIG. 2 illustrates three separate waveforms versus time. Waveform 28 represents the constant DC voltage source provided by either of battery cells 14, 16. Waveform 30 represents an alternating current source which can be produced by appropriately switching the transistors 18, 20 of circuit 10 at alternate time intervals. Waveform 32 represents the oscillating power profile which results when the AC current I is coupled with the DC battery voltage V. The power profile of waveform 32 includes positive energy (+w) represented by area 34 and negative energy (−w) represented by area 36, and when ignoring losses, the oscillating power profile V*I has a net zero effective energy exchange.

Figure 3:
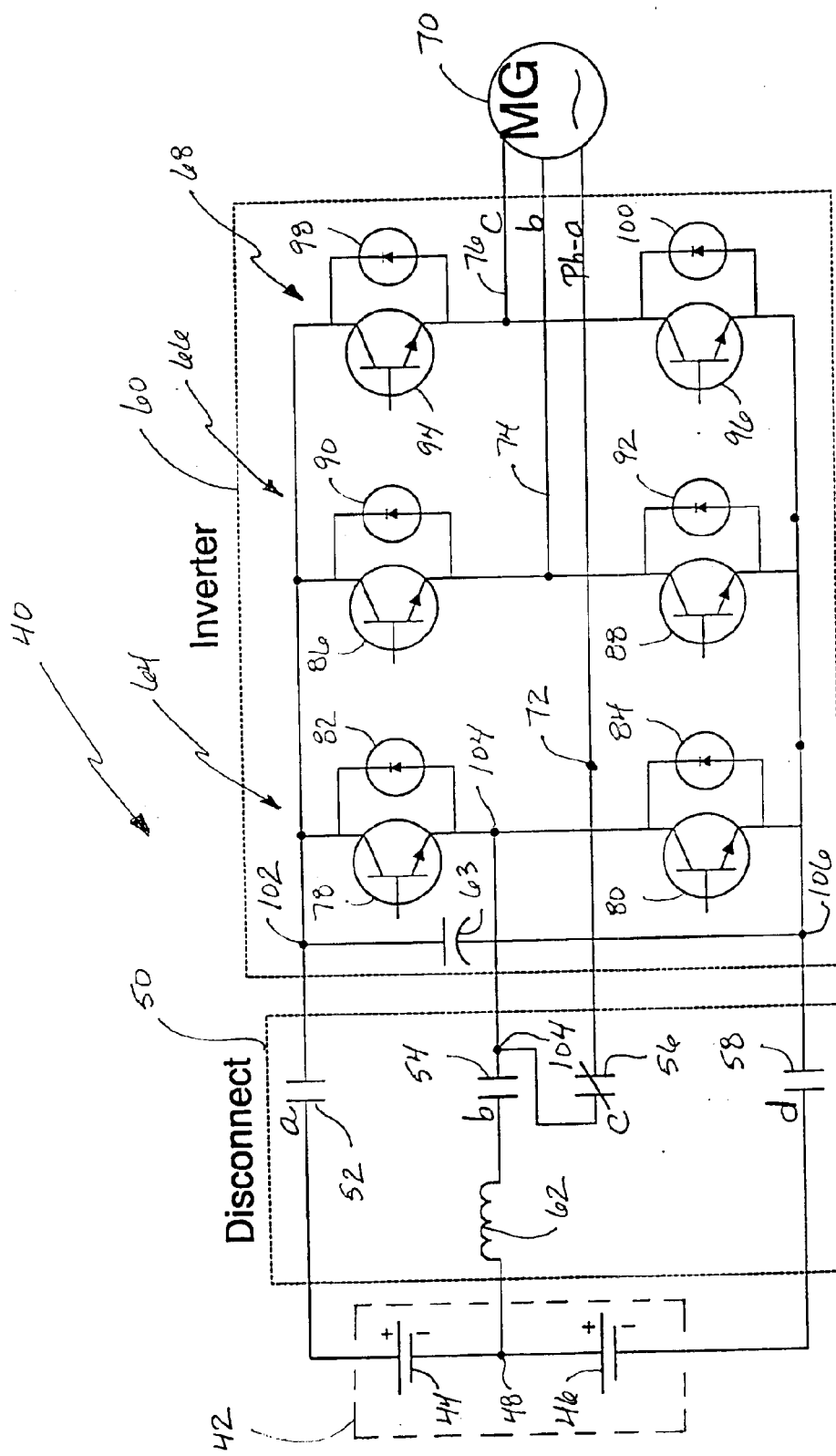
FIG. 3 is a schematic diagram of the dual function power circuit for an electric vehicle in accordance with a preferred embodiment of the present invention.

Turning now to FIG. 3, the power circuit 40 in accordance with a preferred embodiment of the present invention is shown. The power circuit 40 is particularly suited for controlling the power distribution between a multi-cell battery pack 42 and a three-phase motor and generator unit 70. A four-contact electrical disconnect 50 controls the flow of current between battery pack 42 and a three-phase inverter circuit 60.

As disclosed, battery pack 42 includes a first battery cell 44 and a second battery cell 46 having a common node 48 formed therebetween. Each battery cell 44, 46 within battery pack 42 may include one or more individual energy storage devices or cells, and may also be chosen from a wide variety of battery technologies.

The power circuit disconnect 50 includes four separate switching elements. As shown, switching element 52 is connected between the positive terminal of battery 44 and a first node 102 of the inverter circuit 60. An inductor 62, preferably contained within the power circuit disconnect 50, is connected between common node 48 and one terminal of the second switching element 54. The other terminal of switching element 54 is connected to a second node 104 of the inverter. A third switching element 56 is connected to second node 104, and its other terminal is connected to line or node 72 of the motor 70. The fourth switching element 58 is connected between the negative terminal of the battery cell 46 and a third node 106 of the inverter circuit 60.

The inverter circuit 60 is preferably a three-phase DC to AC inverter having a first inverter branch 64, a second inverter branch 66, and a third inverter branch 68. A capacitor 63 associated with power circuit 40 is connected between the first node 102 and the third node 106. Each branch 64, 66, 68 of the inverter circuit 60 includes electronic components which are substantially similar to those shown with the inverter circuit 10 of FIG. 1. More specifically, the first inverter branch 64 includes a first transistor 78 and a second transistor 80 which are connected between the first node 102 and the third node 106. An anti-parallel diode 82 is connected in parallel with transistor 78, and an anti-parallel diode 84 is connected in parallel with transistor 80. The second node 104 is also disposed between transistors 78 and 80.

The second inverter branch 66 also includes a first transistor 86 and a second transistor 88 which are connected as shown between the first node 102 and the third node 106. Line or node 74 is disposed between the first and second transistors 86, 88. A first anti-parallel diode 90 is connected in parallel with transistor 86 and an anti-parallel diode 92 is connected in parallel with transistor 88.

The third inverter branch 68 also includes a first transistor 94 and a second transistor 96 which are similarly connected between the first node 102 and the third node 106. Line or node 76 is disposed between first and second transistors 94, 96. An anti-parallel diode 98 is connected in parallel with transistor 94 and an anti-parallel diode 100 is connected in parallel with transistor 96.

In operation, the DC to AC inverter 60 produces three-phase power on lines 72, 74, 76 for powering the electric motor 70 for driving the electric vehicle. FIG. 3 shows how the circuitry in these existing vehicle components can be used to accomplish the dual function of the present invention. As shown, the four-contact power circuit disconnect 50, upon activation in subzero temperatures, will first make contacts 52, 54 and 58 while contact 56 is kept open. During this time period, the first branch or pole 64 of the inverter circuit 60 operates as described above to generate an alternating current for warming up the battery by injecting the AC current through the center tap or common node 48 of the battery pack 42. Within approximately 50 seconds, or whatever time the control algorithm determines, (e.g., based on temperature feedback), contact 54 of the disconnect circuit 50 opens and contact 56 closes at which point the inverter circuit 60 will be ready to operate the electric motor 70.

Figure 4:
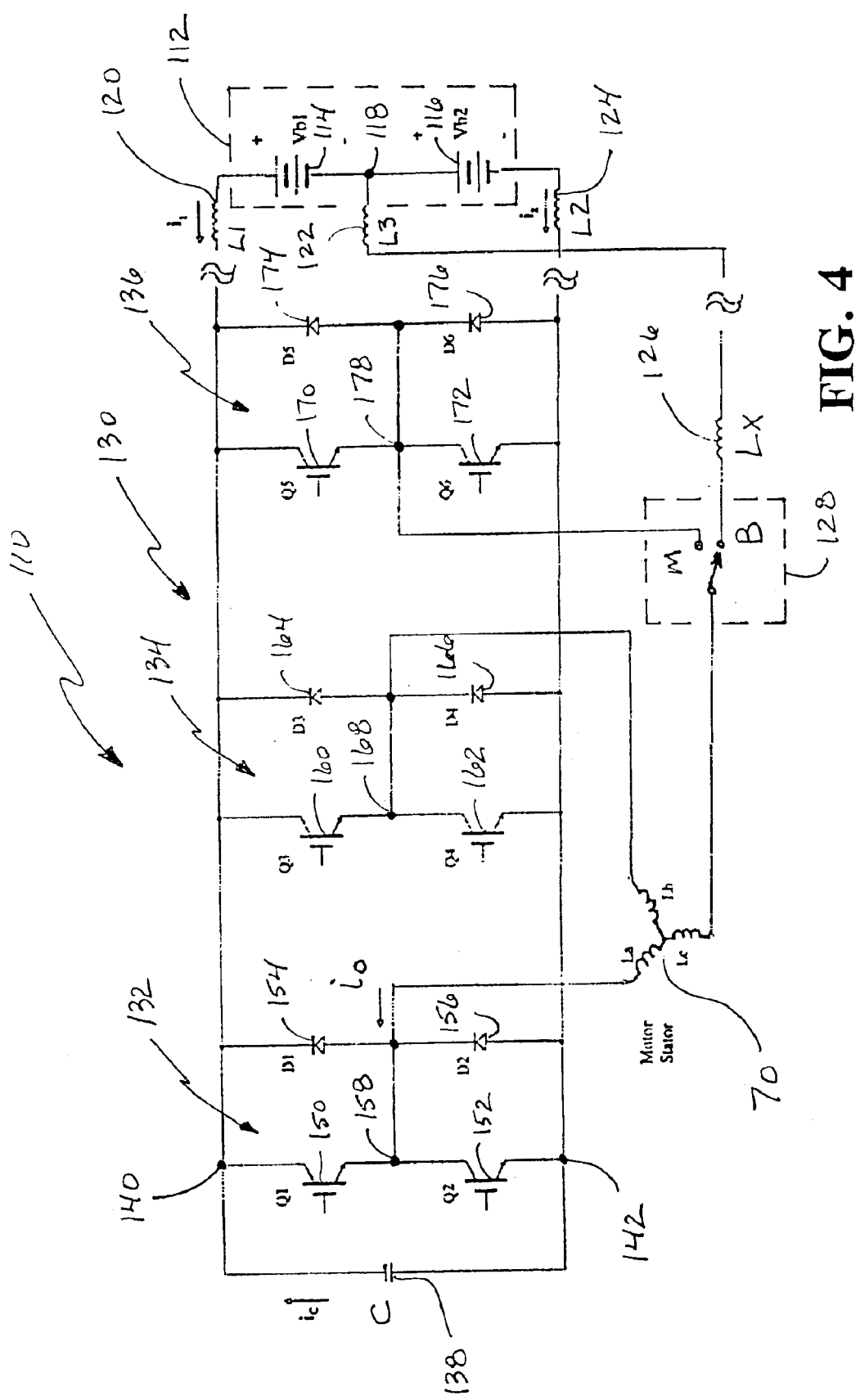
FIG. 4 is a schematic diagram of the dual function power circuit, also in accordance with a preferred embodiment of the present invention.

Turning now to FIG. 4, the power circuit 110 in accordance with an alternate preferred embodiment of the present invention is shown. The power circuit 110 is also suited for controlling the power distribution between a multi-cell battery pack 112 and a three-phase motor and generator unit 70. In the embodiment of FIG. 4, a two-position switch 128 is connected between the battery pack 112 and the electric motor 70. The switch 128 controls the flow of current to the electric motor 70 or to the battery pack 112 depending upon the switch position.

As disclosed, battery pack 112 includes a first battery cell 114 and a second battery cell 116 having a common node 118 formed there between. Each battery cell 114, 116 within battery pack 112 may include one or more individual energy storage or devices or cells, and may also be chosen from a wide variety of battery technologies.

The inverter circuit 130 is preferably a three-phase DC to AC inverter having a first inverter branch 132, a second inverter branch 134, and a third inverter branch 136. A capacitor 138 associated with power circuit 110 is connected between the first node 140 and the second node 142. Each branch 132, 134, 136 of the inverter circuit 130 includes electronic components which are substantially similar to those shown with the inverter circuit of FIG. 1. More specifically, the first inverter branch 132 includes a first transistor 150 and a second transistor 152 which are connected between the first node 140 and the second node 142. An anti-parallel diode 154 is connected in parallel with transistor 150, and an anti-parallel diode 156 is connected in parallel with transistor 152. The first phase node 158 is connected between transistors 150 and 152.

The second inverter branch 134 also includes a first transistor 160 and a second transistor 162 which are connected as shown between the first node 140 and the second node 142. A second phase line 168 is connected between the first and second transistors 160, 162. A first anti-parallel diode 164 is connected in parallel with transistor 160 and a second anti-parallel diode 166 is connected in parallel with transistor 162.

The third inverter branch 136 also includes a first transistor 170 and a second transistor 172 which are similarly connected between the first node 140 and the second node 142. A third switchable line 178 is connected between first and second transistors 170 and 172. A first anti-parallel diode 174 is connected in parallel with transistor 170 and a second anti-parallel diode 176 is connected in parallel with transistor 172.

In operation, the DC to AC inverter 130 also produces three-phase power on lines 158, 168, 178 for powering the electric motor 70 for driving the electric vehicle. FIG. 4 further illustrates the power circuit 110 also provides an AC battery heater that is derived from one branch or phase 132 of a three phase inverter circuit 130 for an AC motor 70. When switch 128 is in position M, the power circuit 110 functions as a motor drive circuit for powering the electric vehicle. When the switch 128 is in position B, the circuit 110 functions as an AC battery heater as described herein. One advantage of this system is that the same power circuit 110 can provide both a motor drive and a battery heater for applications such as electric vehicles.

Figure 5:
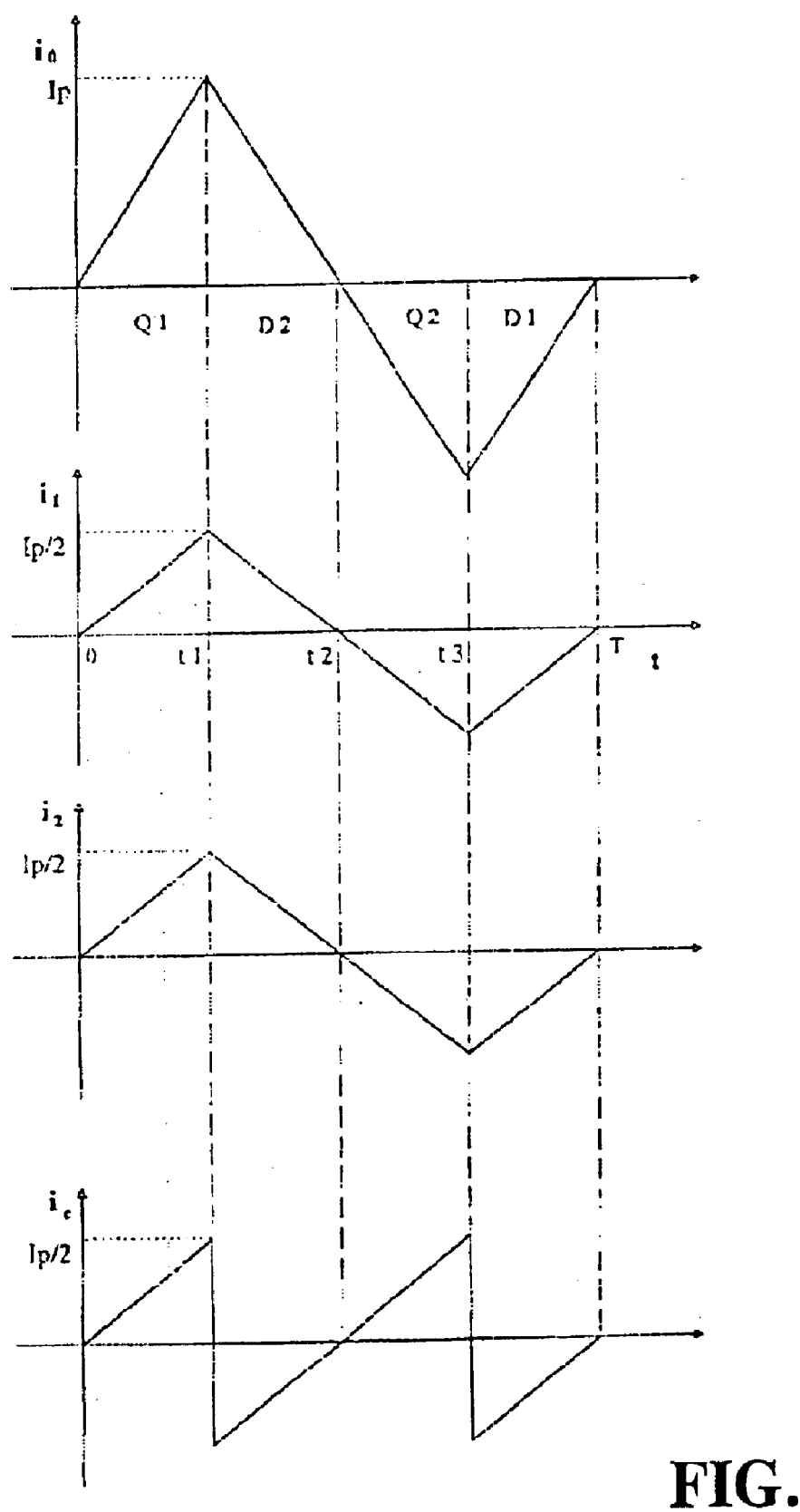
FIG. 5 is a waveform diagram showing the current waveforms associated with a preferred embodiment of the present invention.

When the switch 128 is in position B for warming the battery pack 112, a control circuit (not shown) will alternately switch transistor 150 (Q1) and transistor 152 (Q2) to create the alternating currents $i_1$ and $i_2$ (FIG. 5) in the two batteries 114 and 116. It should be understood that while in the battery warming mode transistors 160, 162, 170, and 172 as well as diodes 164, 166, 174, and 176 are inactive. In an ideal circuit, inductances $L_1$ 120, $L_2$ 124, $L_3$ 122 and capacitor C 138 would not be present, and $i_1$ and $i_2$ would be much different from the waveforms shown in FIG. 5. FIG. 5 shows the modeled current waveforms for currents $i_O$, $i_1$, $i_2$, and $i_C$. However, $L_1$ 120, $L_2$ 124, and $L_3$ 122 will always be present due to the parasitic inductance of the cables that connect the circuit 130 to batteries 114 and 116. Also shown is inductance $L_X$ 126 which is modeled as an external inductance associated with the power circuit 110. Because of the energy stored in $L_1$ 120 and $L_2$ 124, capacitor C 138 is highly preferred to prevent excessive voltages across the transistors 150 Q1 and 152 Q2 when they turn off.

Another goal of the present invention is to minimize the current due to resonance between the capacitor C 138 and the inductances $L_1$ 120 and $L_2$ 124. If the switching frequency of transistors Q1 and Q2, f=1/T, is sufficiently close to the natural resonant frequency $f_o$, where $$f_o = \frac{1}{2\pi\sqrt{(L_1+L_2)C}}$$

then the currents $i_1$ and $i_2$ will contain excessive resonant components. A relatively simple control system can be achieved if resonance is avoided. This may be achieved if C is large enough so that, $$f \gg f_o.$$

When $f \gg f_o$, the circuit will operate in the following manner in the steady state. The following description is also depicted graphically in FIG. 5.

Q1 on: $i_0=i_1+i_c$, $i_c=i_2$ and all currents reamp towards their peak until Q1 turns ($0 \leq t \leq t_1$) off at $t_1$.

D2 on: $i_0=-i_c+i_2$, $i_1=-i_c$ and all currents ramp towards 0 until D2 turns off ($t_1 \leq t \leq t_2$) at $t_2$.

Q2 on: $-i_0=-i_2+ic$, $i_c=-i_1$ and all currents ramp towards their peak until Q2 ($t_2 \leq t \leq t_3$) turns off at $t_3$.

D1 on: $-i_0=-i_1-i_c$, $-i_c=-i_2$ and all currents ramp towards 0 until D1 turns ($t_3 \leq t \leq t_4$) off at T.

The resulting battery currents, $i_1$ and $i_2$, are almost exactly half of $i_0$.

Figure 6:
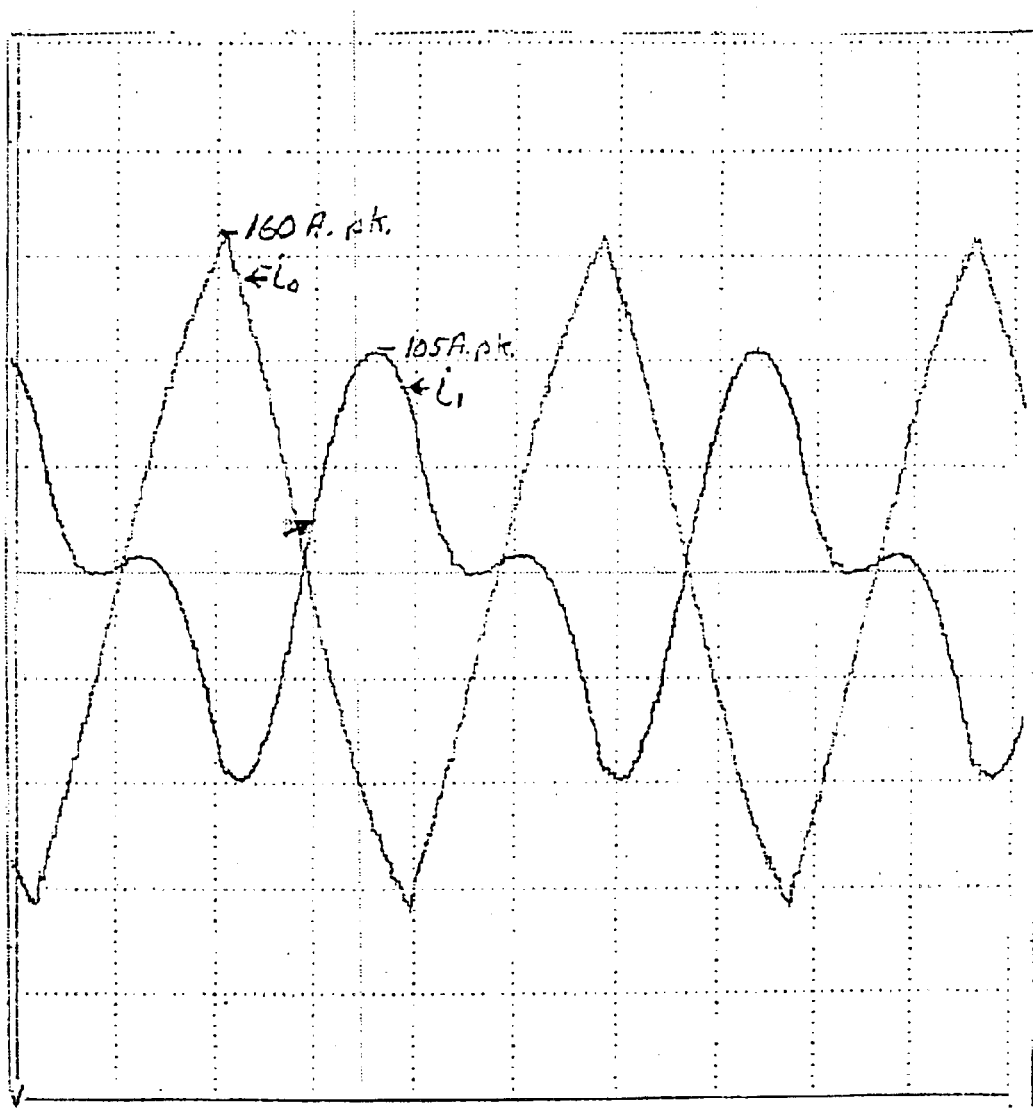
FIG. 6 is a graphical representation of typical current waveforms produced by the dual function power circuit.
Figure 7:
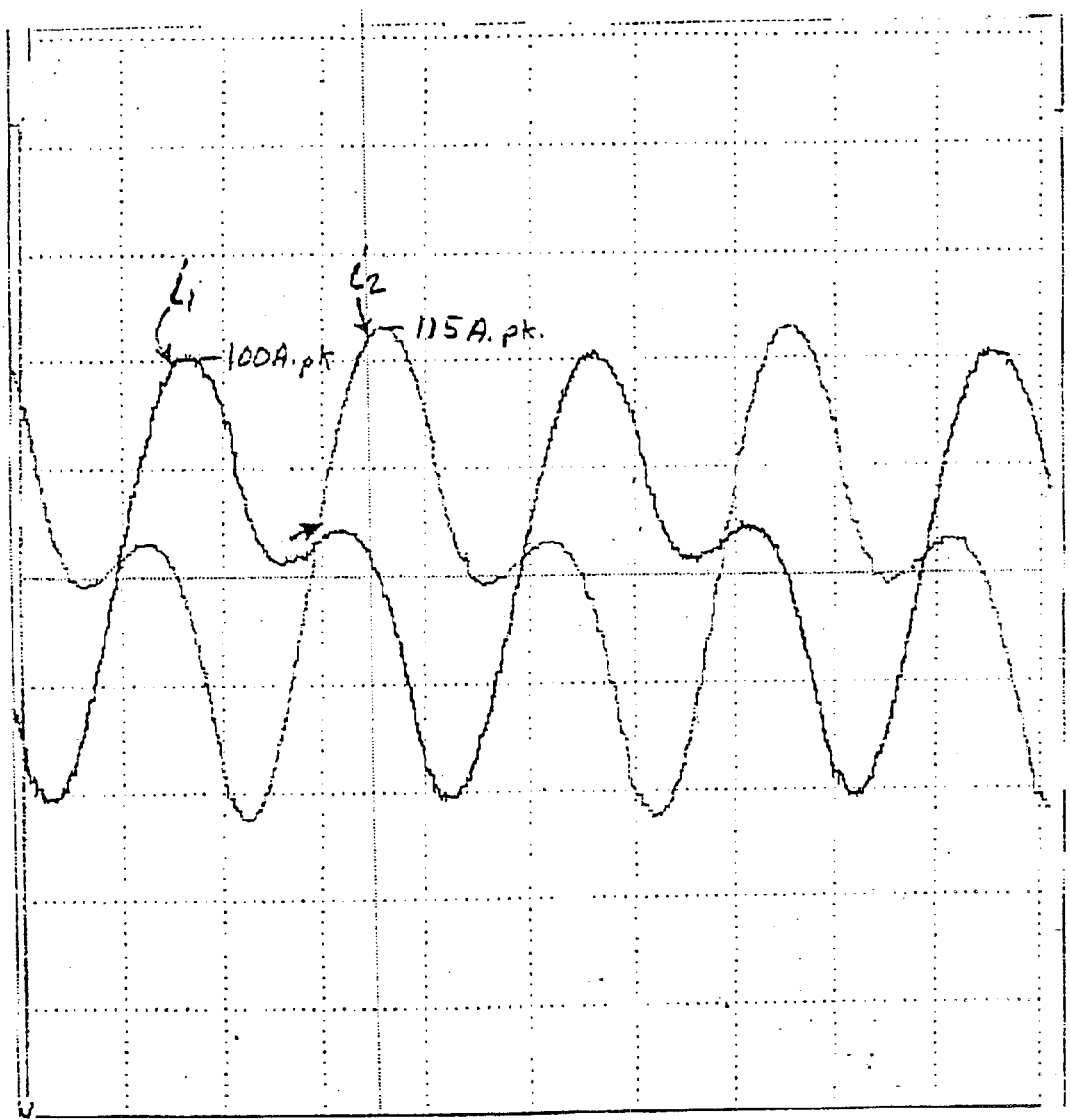
FIG. 7 is also a graphical representation of typical current waveforms produced by the dual function power circuit.

If the condition of $f \gg f_o$ is not met, current regulation can become more complex, but higher $I_{1RMS}/I_{ORMS}$ and $I_{2RMS}/I_{ORMS}$ ratios can be achieved. The advantage of this is that the same RMS battery currents, $I_{1RMS}$ and $I_{2RMS}$, can be achieved with lower losses in Q1, Q2, D1, D2 and the total inductance, $L_0$, seen by current $i_0$—i.e., $L_0=L_a+L_b+L_3$. Typical $-i_0$, $i_1$ and $i_2$ waveforms are also shown in FIGS. 6 and 7.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. An apparatus connected to an energy storage device for powering an electric motor and providing a warming function for the energy storage device, said apparatus comprising:

a circuit connected to the electric motor and the energy storage device for generating an alternating current; and switching means operably associated with the circuit for selectively directing the alternating current to one of the electric motor and the energy storage device.

2. The apparatus of claim 1 wherein the switching means includes a switching device operable between a first state for directing the alternating current to the electric motor and a second state for directing the alternating current through the energy storage device.

3. The apparatus of claim 1 wherein the circuit is an inverter circuit for generating the alternating current from the energy storage device.

4. A circuit for powering an electric motor and warming an energy storage device, the energy storage device including at least first and second cells having positive and negative terminals and a centertap formed between the first and second cells, the circuit comprising:

an inverter circuit connected to the energy storage device for generating an alternating current; and a switching device connected to the positive and negative terminals and to the centertap of the energy storage device, the switching device operably associated with the inverter circuit for selectively controlling the alternating current flow to one of the electrical motor and the energy storage device;

the switching device providing a first electrical connection between the centertap of the energy storage device and the inverter circuit for directing the alternating current through the energy storage device for generating heat; and the switching device providing a second electrical connection between the inverter circuit and the electrical motor for directing the alternating current to the electric motor.

5. The circuit of claim 4 wherein the inverter circuit includes three separate DC to AC power inverter branches connected in parallel.

6. The circuit of claim 4 wherein the electrical connection between the centertap of the energy storage device and the inverter circuit heats the energy storage device by cycling the alternating current through the energy storage device.

7. The circuit of claim 5 wherein each of the DC to AC power inverter branches further includes two transistors and a common node formed therebetween.

8. The circuit of claim 5 wherein each of the DC to AC power inverter branches generates an alternating current by alternately switching two transistors between a conducting state and a nonconducting state via a control circuit.

9. The circuit of claim 5 wherein the switching device includes an inductor connected between the centertap of the energy storage device and the inverter circuit.

10. A circuit for powering an electric motor and warming an energy storage device, the energy storage device including first and second cells having a centertap formed therebetween and positive and negative terminals at each end of the energy storage device, the circuit comprising:

an inverter circuit connected to the electric motor and the positive and negative terminals of the energy storage device, the inverter having a plurality of current switching branches for generating an alternating current, each current switching branch having upper and lower nodes for connecting each current switching branch to the energy storage device, and a common node for connecting each current switching branch to the electric motor; and a disconnect circuit connected to the inverter circuit and the energy storage device operable for switching between a first mode and a second mode;

the first mode directing the alternating current from the energy storage device to the current switching branches of the inverter circuit for powering the electric motor; and the second mode isolating a first branch of the inverter circuit from the remaining branches of the inverter circuit and the electric motor, wherein the first isolated branch can be switched for circulating the alternating current through the energy storage device.

11. The circuit of claim 10 wherein the disconnect circuit includes first, second, third, and fourth switching elements.

12. The circuit of claim 11 wherein the first switching element connects the positive terminal of the energy storage device and the upper node of the first current switching branch.

13. The circuit of claim 11 wherein the second switching element connects the centertap of the energy storage device and the common node of the first current switching branch.

14. The circuit of claim 11 wherein the third switching element connects the electric motor and the common node of the first current switching branch.

15. The circuit of claim 11 wherein the fourth switching element connects the negative terminal of the energy storage device and the lower node of one of the current switching branches.

16. The circuit of claim 11 wherein the disconnect circuit is operable for disconnecting the first, third, and fourth switching elements for operating the disconnect circuit in the first mode.

17. The circuit of claim 11 wherein the disconnect circuit is operable for disconnecting the first, second, and third switching elements for operating the disconnect circuit in the second mode.

18. The circuit of claim 11 wherein the alternating current passes from the common nodes of all of the switching branches to the electric motor when the disconnect circuit operates in the first mode.

19. The circuit of claim 11 wherein the alternating current passes from the common node of the first switching branch to the centertap of the energy storage device for warming the energy storage device when the disconnect circuit operates in the second mode.

20. The circuit of claim 10 where in the disconnect circuit includes an inductor connected between the centertap of the energy storage device and the common node of the inverter circuit.

* * * * *